US007552444B2

(12) United States Patent
Alcorn et al.

(10) Patent No.: US 7,552,444 B2
(45) Date of Patent: Jun. 23, 2009

(54) METHOD AND APPARATUS FOR ATTACHING AN INFORMATIONAL DIALOG TO A JAVA BEAN

(75) Inventors: John William Alcorn, Austin, TX (US); James Irwin Knutson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 10/851,792

(22) Filed: May 21, 2004

(65) Prior Publication Data

US 2004/0216088 A1    Oct. 28, 2004

(51) Int. Cl.
*G06F 13/00*    (2006.01)
(52) U.S. Cl. .................... 719/316; 719/331; 719/332; 717/108; 717/120
(58) Field of Classification Search ................. 719/316, 719/331, 332; 717/108, 120
See application file for complete search history.

(56) References Cited

U.S. PATENT DOCUMENTS

| 5,541,991 | A | | 7/1996 | Benson et al. ................. 380/4 |
| 5,933,144 | A | * | 8/1999 | Alcorn ....................... 715/809 |
| 6,134,432 | A | | 10/2000 | Holmes et al. .............. 455/412 |
| 6,185,730 | B1 | | 2/2001 | LeBlanc ........................ 717/1 |

OTHER PUBLICATIONS

Fox, "Using BeanExtender's Dipping Technique", IBM Web Site, pp. 1-13.
Heichler, "IBM Brews Java Tools", Computerworld, Jul. 14, 1997, p. 53.

* cited by examiner

*Primary Examiner*—Andy Ho
(74) *Attorney, Agent, or Firm*—Yee & Associates, P.C.; David A. Mims, Jr.

(57) ABSTRACT

A method in a data processing system for attaching an informational dialog to a program. The program is morphed to extend an existing interface to the program to become a dippable program. A dip is created, wherein the dip modifies runtime behavior of the existing interface of the dippable program to include an informational dialog. The dip is added to the dippable program, wherein the informational dialog is attached to the dippable program. The dialog is displayed just before the dippable program is displayed.

20 Claims, 7 Drawing Sheets

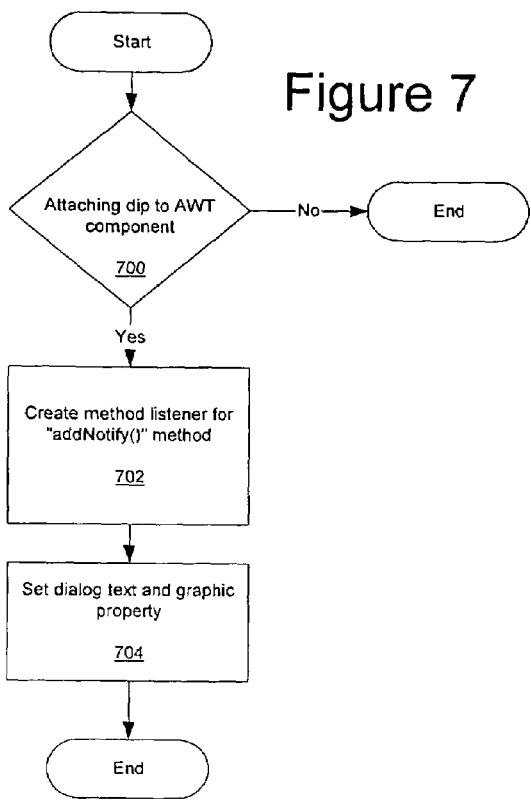
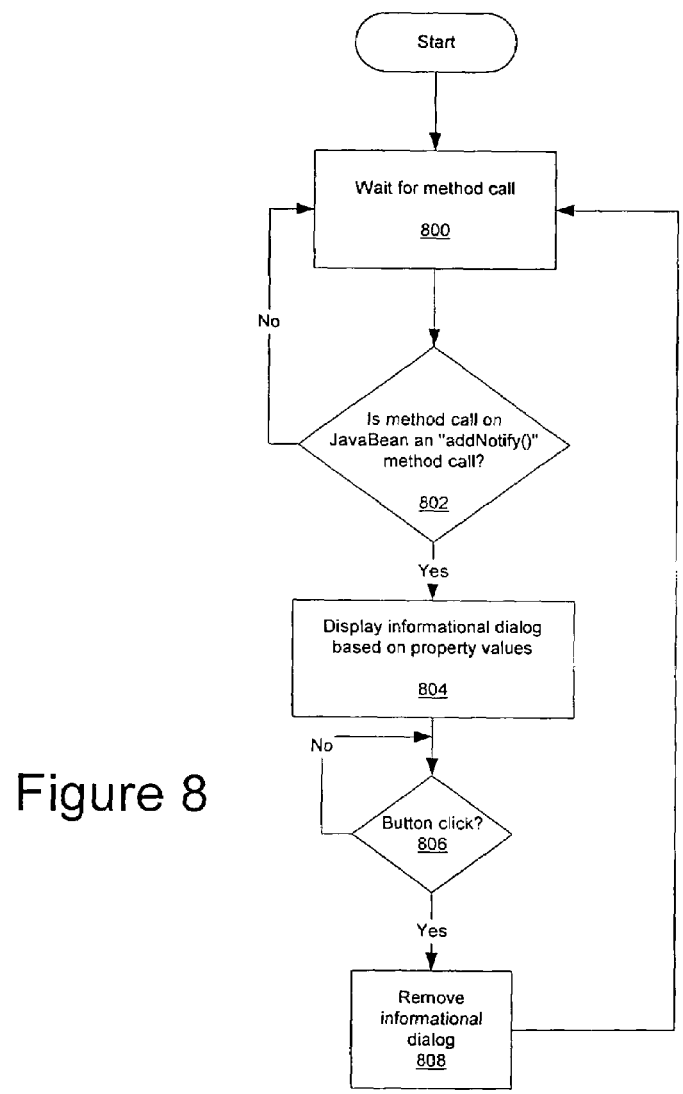
Figure 7
Figure 8

```
        if (noticeText.equals("") && imageName.equals("")) return;         900 parentFrame = null;
        Component parent = myDippableBean;
        while ((parentFrame==null) && (parent/=null)) {
            if (parent instanceof Frame) {
                parentFrame = (Frame) parent;
902         } else {
                parent = parent.getParent();
            } /* endif */
        { /* endwhile */
        if (parentFrame==null) parentFrame = new Frame ("Splash Screen");
     // splashWindow = new Window(parentFrame); //this causes no border - looks embedded i
     // splashWindow = new Dialog(parentFrame, "Splash Screen", true); //being modal cause splashWindow = new Dialog(parentFrame, "Splash Screen");       904 if (!imageName.equals("")) {
            ImageViewer image = new ImageViewer(imageName);        906
            splashWindow.add("North", image);
        } /* endif */ if (!noticeText.equals("")) {
            TextArea text = new TextArea(noticeText);
            text.setEditable(false);                               908
            splashWindow.add("Center", text);
        } /* endif */

Button button = new Button ("OK");
        button.addActionListener(this);                    910
        splashWindow.add("South", button);

splashWindow.pack();
        Dimension splashSize = splashWindow.getSize();
        Dimension screenSize = splashWindow.getToolkit().getScreenSize();

if (splashSize.width>screenSize.width) {
            splashWindow.setSize(screenSize.width, splashSize.height);
            splashSize = splashWindow.getSize();
912     } /* endif */ if (splashSize.height>screenSize.height-30)  { //allow for Start Bar/WarpCenter
            splashWindow.setSize(splashSize.width, screenSize.height-30);
            splashSize = splashWindow.getSize();
        } /* endif */ splashWindow.setLocation((screenSize.width-splashSize.width)/2,
                                 (screenSize.height-30-splashSize.height)/2);    914

916     parentFrame.setEnabled(false); //workaround for modality deadlock
        splashWindow.setVisible(true);

splashWindow.setVisible(false);
918     splashWindow.dispose();
        parentFrame.setEnabled(true); //workaround for modality deadlock
        parentFrame = null;
```

Figure 9

METHOD AND APPARATUS FOR ATTACHING AN INFORMATIONAL DIALOG TO A JAVA BEAN

CROSS REFERENCE TO RELATED APPLICATION

The present invention is related to an application entitled Method And Apparatus For Dynamic Application And Maintenance Of Programs, filed Jul. 30, 1998, Ser. No. 09/124,718, now is U.S. Pat. No. 6,330,711, assigned to the same assignee and incorporated herein by reference.

BACKGROUND OF THE INVENTION

1. Technical Field

The present invention relates generally to an approved data processing system and in particular to object-oriented programming systems. Still more particularly, the present invention relates to a method and apparatus for attaching informational dialogs to Java Beans.

2. Description of Related Art

Object-oriented programming techniques involve the definition, creation, use, and instruction of "objects". These objects are software entities comprising data elements or attributes and methods, which manipulate data elements. Objects also may include data related to events outside of the object to trigger or control methods within the object.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods.

The Java virtual machine (JVM) is a virtual computer component that resides in memory. In some cases, the JVM may be implemented in a processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

To enable a Java application to execute on different types of data processing systems, a compiler typically generates an architecture-neutral file format—the compiled code is executable on many processors, given the presence of the Java run-time system. The Java compiler generates bytecode instructions that are non-specific to a particular computer architecture. These bytecodes are executed by a Java interpreter. A Java interpreter is a module in the JVM that alternately decodes and executes a bytecode or bytecodes.

A Java bean is a reusable component. Currently, no standard is defined for how to attach an informational dialog, often referred to as a "splash screen", to an existing Java bean. Such a dialog would appear whenever the given Java bean is executed, just before it is displayed, and would contain text and/or an image, with a button used to dismiss the dialog. Splash screens usually contain legal information, or simply information about the company that developed the product. Splash screens can also be used as reminders, such as in the case of shareware software that should be registered and paid for.

Furthermore, since Java beans are a form of component software, it is often the case that one Java bean will be created by connecting together, or "aggregating", several Java beans from various sources to form an application. In such cases, the person performing the aggregation is often not an actual programmer. But just an "application assembler", who simply takes "off-the-shelf" software components and puts them together in a way that would be useful to a particular audience. These application assemblers find it undesirable to be required to learn Java coding sufficiently to create a splash screen to attach to their creations. Instead, application assemblers would prefer a standard means to attach a customizable splash screen dialog to their assembled Java bean without having to write code to attach the splash screen.

In addition, attachment of a splash screen dialog to a Java bean should avoid having to modify the original Java bean in question after development or aggregation was complete. As a post-development process requiring no access to the source code of the original Java bean, the addition of a splash screen is one that might be added by a legal department just before making the finished product available. It is also desirable that the application of the splash screen could be performed by another organization altogether, such as a software distributor attaching disclaimers or advertisements.

Therefore, it would be desirable to have an improved method and apparatus for attaching an informational dialog, such as a splash screen dialog, to a Java bean.

SUMMARY OF THE INVENTION

The present invention provides a method in a data processing system for attaching an informational dialog to a program. The program is morphed to extend an existing interface of the program to become a dippable program. A dip is created, wherein the dip modifies runtime behavior of the existing interface of the dippable program to include an informational dialog. The dip is added to the dippable program, wherein the informational dialog is attached to the dippable program.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a flowchart of a process for attaching a Java bean using a dip as illustrated in accordance with a preferred embodiment of the present invention;

FIG. 8 is a flowchart of a process for displaying an informational dialog illustrated in accordance with a preferred embodiment of the present invention; and FIG. 9 is a diagram of code used in a splash screen dip in accordance with a preferred embodiment of the present invention.

DETAILED DESCRIPTION OF THE PREFERRED EMBODIMENT

Figure 1:
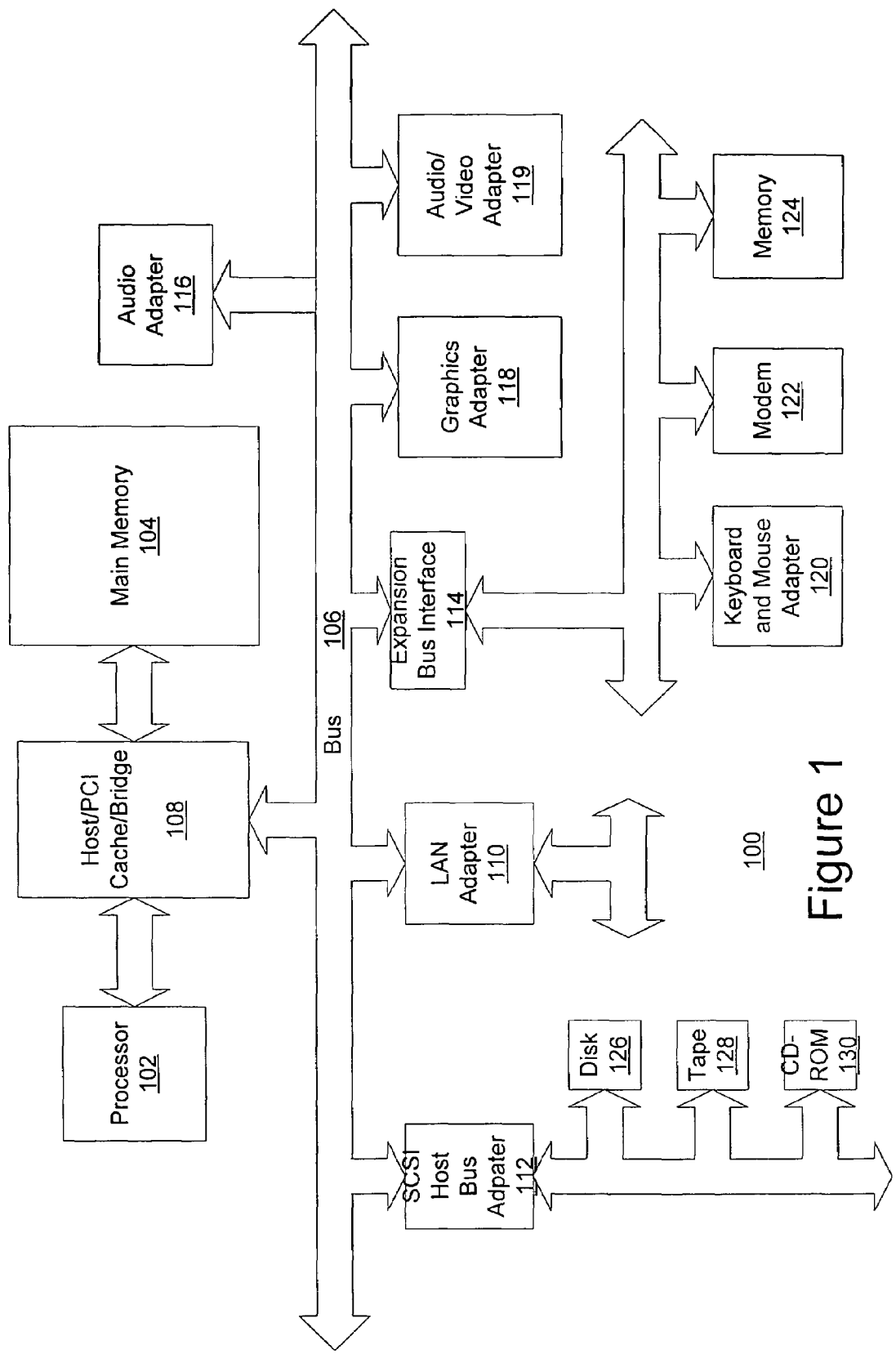
FIG. 1 is a block diagram of a data processing system in which the present invention may be implemented.

With reference now to the figures and in particular with reference to FIG. 1, a block diagram of a data processing system 100 in which the present invention may be implemented is illustrated. Data processing system 100 may be used either as a server or a computer. Data processing system 100 employs a peripheral component interconnect (PCI) local bus architecture. Although the depicted example employs a PCI bus, other bus architectures such as Micro Channel and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, Small Computer System Interface (SCSI) host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 100. Instructions for the operating system, the object-oriented operating system, and applications or programs may be located on storage devices, such as hard disk drive 126 and may be loaded into main memory 104 for execution by processor 102

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. The depicted example is not meant to imply architectural limitations with respect to the present invention. For example, the processes of the present invention may be applied to a multiprocessor data processing system.

The present invention provides a method, data processing system, and instructions for attaching an informational dialog to a Java bean. According to the present invention, an informational dialog dip, also referred to as a splash screen dip, is created for use with a dippable Java bean. This dip provides easily customizable properties for specifying text and/or a file name for an image to be displayed in the splash dialog. This dip may be attached to a Java bean by dipping the Java bean into the splash screen dip. No source code is required to be added to the Java bean being dipped. The Java bean's functionality is not modified by the splash screen dip. In this manner, the processes of the present invention may be used to add informational dialogs to beans or applications without requiring programming knowledge about Java.

In the depicted examples, the processes of the present invention are implemented using the Java programming system, which is an object oriented programming system. Object-oriented programming techniques involve the definition, creation, use, and instruction of "objects". These objects are software entities comprising data elements or attributes and methods, which manipulate data elements. Objects also may include data related to events outside of the object to trigger or control methods within the object.

Objects are defined by defining "classes", which are not objects, but templates, which instruct a compiler how to construct the actual object. For example, a class may specify the number and type of data variables and the steps involved in the functions, which manipulate data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques: encapsulation, polymorphism and inheritance. Objects can be designed to hide, or encapsulate, all or a portion of, the internal data structure and the internal functions. More particularly, during program design, a program developer can define objects in which all or some of the data variables and all or some of the related methods are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and prevents the program from being run.

Polymorphism allows objects and functions which have the same overall format, but which work with different data, to function differently to produce consistent results. For example, an object may have the format of attribute data and methods to support a geometric shape. The same format can be used whether the shape is a rectangle or a circle. However, the actual program code which performs the shape formation may differ widely depending on the type of variables which comprise the shape. After the methods have been defined, a program can later refer to the shape formation method by its common format and, during compilation, the compiler will determine which of the shaping methods to be used by examining the variable types. The compiler will then substitute the proper function code.

A third property of object oriented programming is inheritance, which allows program developers to reuse pre-existing programs. Inheritance allows a software developer to define classes and the objects, which are later created from them as related through a class hierarchy. Specifically, classes may be designated as subclasses of other basic classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

A set of predefined, interconnected classes are sometimes provided to create a set of objects and additional miscellaneous routines which are all directed to performing commonly encountered tasks in a particular environment. Such predefined classes are typically called "frameworks" and essentially provide a prefabricated structure as a basis for creating a working application program.

In object oriented programming such as the previously described Java system, a developer is provided a framework, containing a set of predefined interface objects. The framework contains predefined classes which can be used as base classes and a developer may accept and incorporate some of the objects into these base classes, or the developer may modify or override objects or combinations of objects in these base classes to extend the framework and create customized solutions in particular areas of expertise.

A clarification of the term "framework" as used in object-oriented programming is in order. Frameworks are predefined structures for objects, combinations of objects which form more extensive objects and eventually combinations which provide whole programs.

Frameworks are employed in which predefined, interconnected classes are organized to provide a structure that is the basis for creating a program. In Java, a framework is present that contains predefined classes used as base classes. Objects may be incorporated into these base classes, objects, or combinations of objects.

Figure 2:
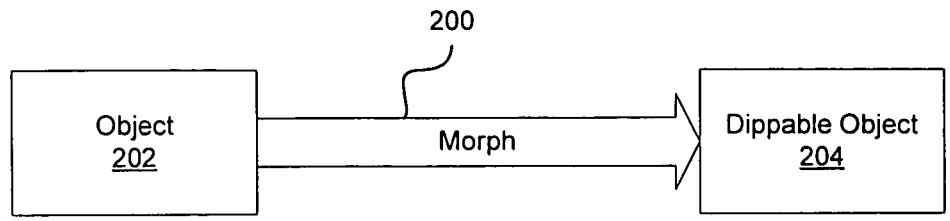
FIG. 2 is a diagram of a morphing operation in accordance with a preferred embodiment of the present invention.

With reference now to FIG. 2, a diagram of a morphing operation is depicted in accordance with a preferred embodiment of the present invention. A morphing operation is applied to object 202 to create a new dippable object 204. Dippable object 204 is object 202 with modifications that allow it to accept additional behavior in the form of a dip. A "dip" is a class that has an interface that allows the class to be used by a dippable object. In essence, dippable object 204 looks and behaves like object 202, but has the added ability to accept behavioral modification components. Object 202 may be a Java class, such as, for example, a flight reservation program used to select and make reservations for airline flights or a gaming program. When the object is morphed through morphing operation 200, the object becomes a dippable object. The dippable object may have its behavior modified or have behavior added to it. Morphing results in a new class that looks and behaves like before, but has the function of accepting new behaviors in the form of dips. For example, new behavior in the form of an informational dialog may be added to the flight reservation program or gaming program in accordance with a preferred embodiment of the present invention. This informational dialog is implemented using a dip as will be described in more detail below.

Figure 3:
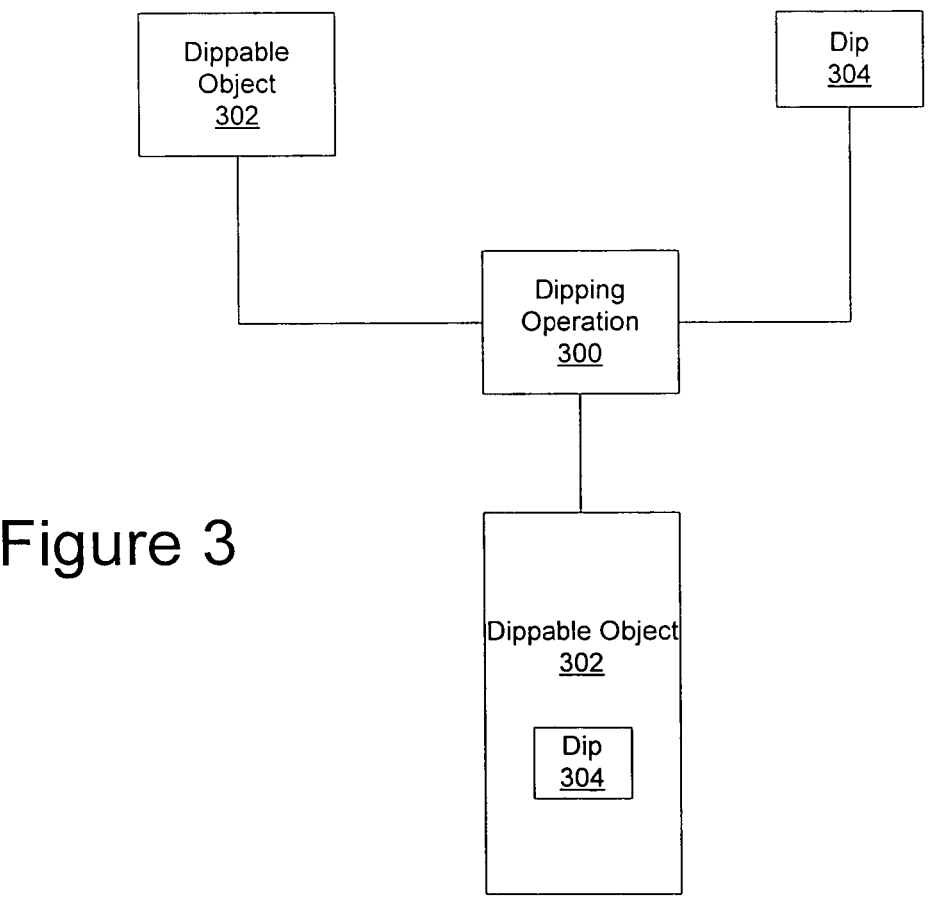
FIG. 3 is a diagram of a dipping operation in accordance with a preferred embodiment of the present invention.

Turning now to FIG. 3, a diagram of a dipping operation is depicted in accordance with a preferred embodiment of the present invention. After an object has been made dippable, behavior modifications may be made using dipping operation 300. Dipping operation 300 uses dippable object 302 and dip 304 as inputs to attach dip 304 to dippable object 302. A dip is an implementation of a dip interface (a class), which allows the class to perform two things: (1) a dip allows an instance of a class which implements the dip interface to be associated with (attached to) an instance of a dippable class, and (2) a dip allows an instance of the class which implements the dip interface, which has been associated with an instance of a dippable class, to modify the behavior of an instance of the dippable class. Dipping is the operation, which associates an instance of the dip class with an instance of a dippable class. Dip 304 encapsulates behavior that is to be added to dippable object 302. In addition, dip 304 controls dippable object 302 with respect to the added behavior. For example, with a flight selection program that has been morphed to be dippable, a dip in the form of an informational dialog containing copyright notice may be added to the flight selection program without having to modify the code or instructions for the flight selection program.

Morphing and dipping are both used to modify a program to add or modify behavior of the object. In accordance with a preferred embodiment of the present invention, these processes are employed to add informational dialogs. In addition, added or modified behavior may be easily removed at a later time by removing the dip. If the informational dialog provides information about the company selling the program and the company name changes, the old dip may be removed and a new dip containing the new company name may be added. In the depicted example, however, removal of informational dialogues is disallowed. Changes may be made in the depicted example by customizing the already attached dip with new text and/or images.

Morphing is a means by which an existing class is examined and duplicated as a subclass such that all methods, events, and properties of the original class can have "before" and "after" notifications performed. In addition, any "before" notification can also veto the execution of the method, property, or event. This mechanism is handled by applying a dip to the subclass resulting from the morphing. The dip then uses the "before" and "after" notifications to modify the behavior of the subclass and therefore the original class. The combined subclass and dip(s) are then saved as a single component. More information on morphing and dipping objects are found in assignee's co-pending U.S. patent application entitled "An Object Oriented Programming System With Objects For Dynamically Connecting Functioning Programming Objects With Objects For General Purpose Operation", LeBlanc et al., Ser. No. 08/953,345, filed Oct. 17, 1997, which is incorporated herein by reference. In this application, "morphing" is described as a process for creating hooks in a connecting object which fires events to notify interested objects. Morphing is the means by which an original general purpose Bean is extended using a connecting layer to hook the original Bean's property changes, event generation, and method calls and notify any interested context layer objects (dips) to produce a dippable general purpose Bean.

To begin, one must understand dips. Dips are beans (reusable software components) that react to state changes in dippable beans to which they are attached. Dippable beans are beans that have been run through a morphing tool, in which the bean is wrapped with an API, so that dips can be applied. Dips modify the runtime behavior of the beans to which they are attached, but they do not provide new interfaces on beans to which they are attached. Dips are attached through the EventListener model. This one-way communication mechanism, while limiting, can be used to add behaviors to a dippable bean. However, if the original bean was thread safe, its dippable version remains thread safe. If the original bean was immutable, the original bean part of the dippable bean remains immutable. The original bean part is what is visible to the clients of the bean. Though dips can add behavior, they cannot add new properties, events, or methods to the bean.

The dipping framework allows the user to take an existing Java class and produce a new class to which dips can be applied. This can be done in one of the following ways: (1) take an existing class and create a new dippable class as a child of the original, parent class; or (2) take an interface and a corresponding implementation class and create a new dippable class that implements the interface and uses the implementation class.

In each case, the new dippable class implements the dippable interface. If desired, the new dippable class could implement the dippable extended interface, which is a child of the dippable interface. Therefore, all dippable classes, even those implementing the dippable extended interface, are implementations of the dippable interface.

During the creation of a new dippable class, dips can be added to the class definition of the dippable bean. Because dips can be added to an instance of a dippable bean, instances of the same class can have different behaviors applied to them through the dipping process. The dipping concept creates a step between development and deployment for Java applications. This step allows new behaviors to be added to existing binary objects.

A dippable bean allows dips to intercept properties, methods, and events. All set<PropertyName>()(1) methods are treated as property-related. All fire<EventName>() or process<EventName>() methods are treated as event-related.

The dipping framework works outside of a beans' environment and works on any Java class that follows the Java beans naming strategy.

With respect to using dips to attach informational dialogs, an informational dialog dip, also called a "splash screen dip" is used to attach an informational dialog to a Java bean. In the depicted examples, this dialog will be displayed just before the bean to which the dip is applied is displayed. The informational dialog may contain text and/or an image. In addition, in the depicted example, the informational dialog will include a button that is used to dismiss the dialog. The original bean may be disabled until the dialog is dismissed. The dialog may be used to convey different types of information, such as, for example, advertisements, company information, disclaimers, license agreements, and registration numbers. In the depicted example, the dip is applied to abstract windowing toolkit (AWT) beans. These dips may be applied to other types of beans through the use of a method hook to determine when to display a splash screen.

Figure 4B:
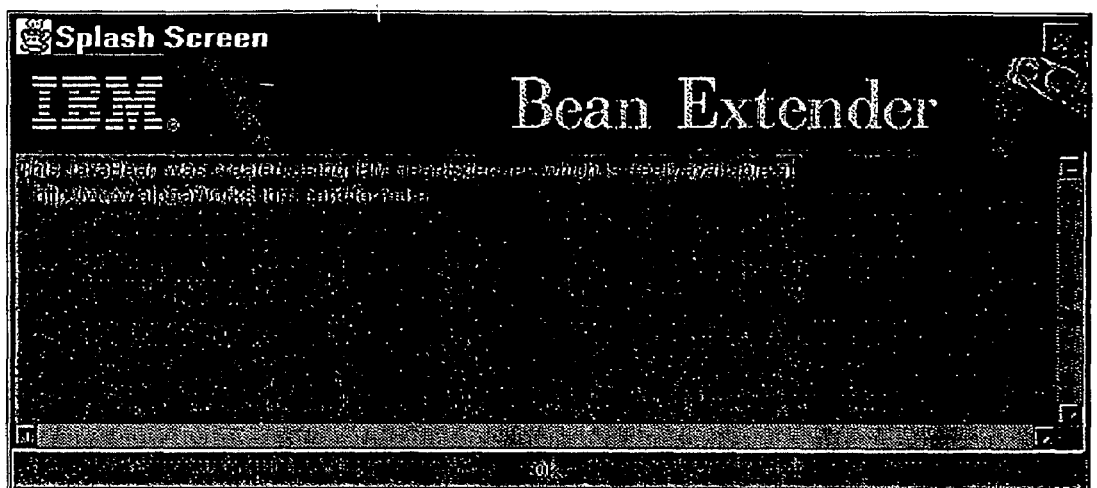
FIGS. 4A-4B are illustrations of processes used to customize an informational dialog dip shown in accordance with a preferred embodiment of the present invention.
Figure 4A:

Turning now to FIGS. 4A-4B, illustrations of a process used to customize an informational dialog dip are shown in accordance with a preferred embodiment of the present invention. An informational dialog may be customized for a dip prior to applying the dip to a bean. In FIG. 4A, a customizer panel 400 in which property values for an informational dialog may be set. The depicted informational dialog depends on an ImageViewer sample bean. This bean is a Java bean that is part of the BeanExtender, which is available from International Business Machines Corporation. More specifically, the ImageViewer is a simple viewer for images, such as gif and jpg images. This bean also supports animation via an animation gif file format. This bean also offers a pop-up menu to allow for loading of a new image. These images may come from a resource available on the class path, such as a *.jar file, or from a location on a local drive. The property values for text are set in field 402 while the image property is set in field 404. The text in this example reads as follows: "This JavaBean was created using IBM BeanExtender, which is freely available at http://www.alphaworks.ibm.com/formula". A path for the selected image is entered into field 404 of customizer panel 400. In the depicted example, the path for the image is C:\Extender\doc\bannerx.gif. If no entry is made for text, this part of the dialog will not be present when the informational dialog is activated. The same follows for the property for specifying an image. If neither are specified, the informational dialog will not appear. In FIG. 4B, screen 410 illustrates an example informational dialog that would be displayed using the property values set in customizer panel 400 in FIG. 4A. When all of the property values are acceptable, a dip is then generated for the informational dialog.

Figure 5:
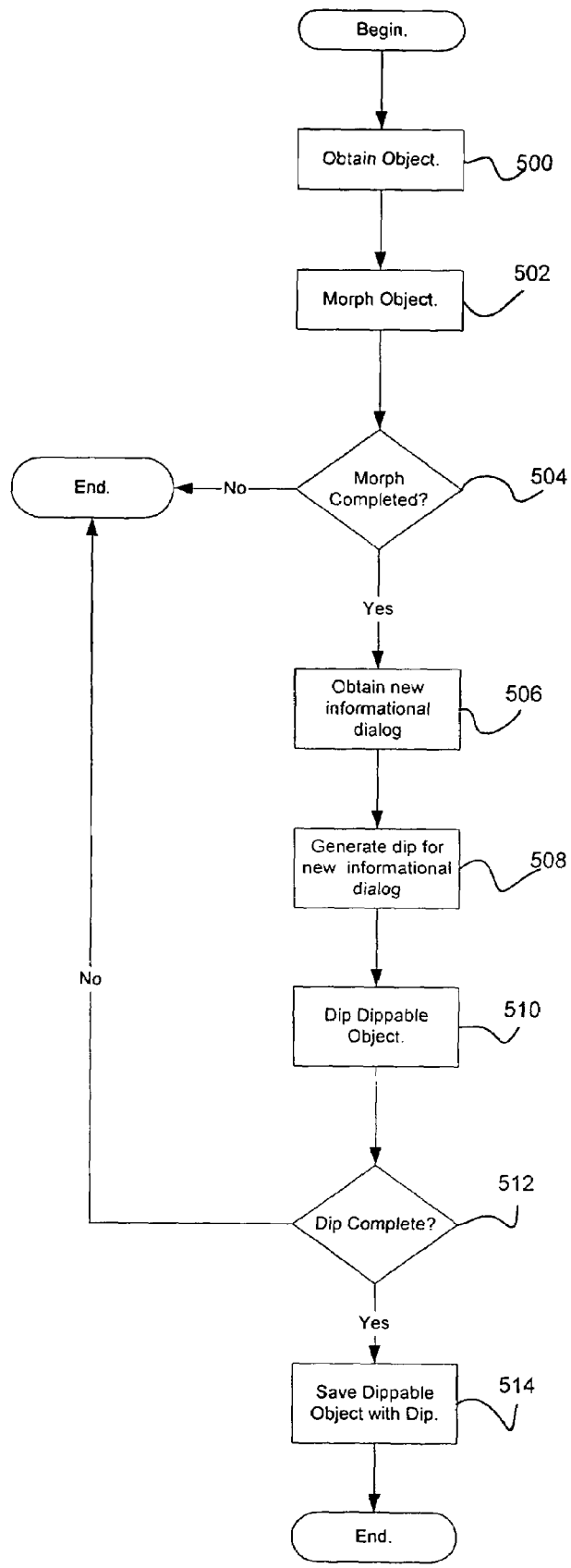
FIG. 5 is a flowchart of a process for adding informational dialogs to an object in accordance with a preferred embodiment of the present invention.

With reference now to FIG. 5, a flowchart of a process for adding informational dialogs to an object is depicted in accordance with a preferred embodiment of the present invention. An object may have more than one informational dialog. For example, the first informational dialog may be one containing advertising while a second one, displayed after the first one is dismissed, may present licensing information. The process in FIG. 5 is applied to create a dippable object from a Java object and to add an informational dialog to the object. The process begins by obtaining an object for which an informational dialog or splash screen is to be added (step 500). Next, the object is morphed (step 502). A determination is made as to whether the morphing process was successfully completed (step 504). If the process was not successful, the process terminates. If the morphing process is successful, a dippable object has been produced. Then, an informational dialog that is to be added to the object is obtained (step 506). A dip is generated for the informational dialog (step 508).

The dippable object is dipped (step 510) with the informational dialog dip. Next, a determination is made as to whether the dipping process was successfully completed (step 512). If the dipping process was not successfully completed, the process terminates. Successful completion of the dipping process results in saving of the dippable object with the dip (step 514), with the process terminating thereafter.

Figure 6:
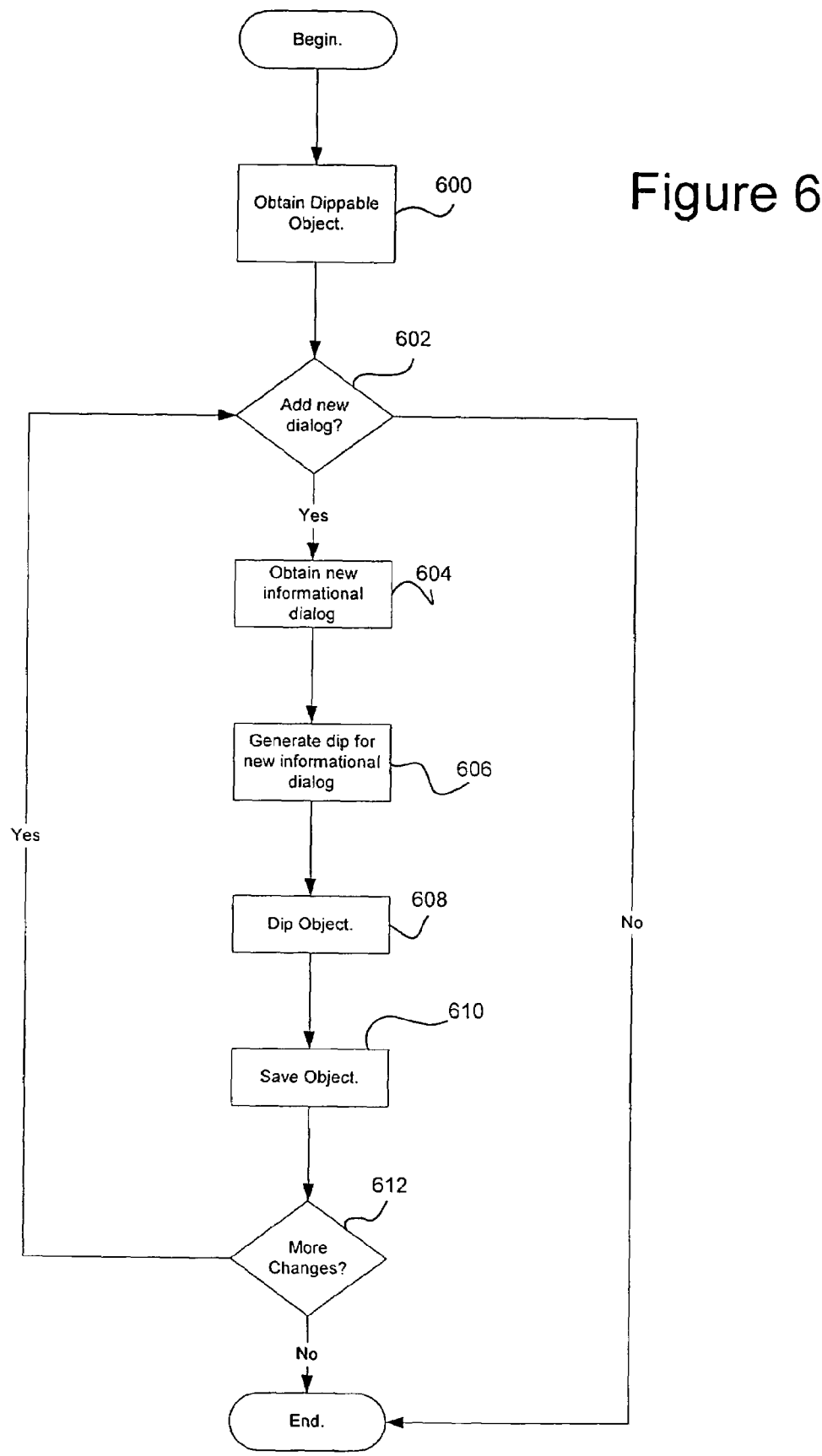
FIG. 6 is a flowchart of a process for adding informational dialogs from a dippable object in accordance with a preferred embodiment of the present invention.

Turning next to FIG. 6, a flowchart of a process for adding and removing informational dialogs from a dippable object is depicted in accordance with a preferred embodiment of the present invention. This process may be applied to dippable objects with and without dips. While the preferred embodiment is to disallow removal of a splash screen, it is just as easy to allow the removal. This might occur, for instance, if a splash screen dip is used in conjunction with a license dip. Without a license, the splash screen is shown. When a license is obtained, the splash screen dip is removed. The process begins by obtaining the dippable object that is to have its behavior modified (step 600). A determination is made as to whether a new informational dialog is to be added to the dippable object (step 602). If a new informational dialog is to be added, the new informational dialog is then obtained (step 604), and a dip is generated for the new informational dialog (step 606). Thereafter, the dippable object is dipped using the dip generated for the informational dialog (step 608). The modified dippable object with the new dip is then saved (step 610). A determination is then made as to whether more changes are to be made to the dippable object (step 612). If more changes are to be made, the process then returns to step 602. Otherwise the process terminates.

With reference again to step 602, if a new informational dialog is not to be added, the process terminates.

With reference now to FIG. 7, a flowchart of a process for attaching dialogs to a Java bean using a dip is depicted in accordance with a preferred embodiment of the present invention. FIG. 7 is a more detailed description of steps 506 and 508 in FIG. 5 and 604 and 606 in FIG. 6.

The process begins by determining whether the dialog is to be attached to an abstract windowing toolkit (AWT) component, which is a Java graphical user interface component (step 700). A java.awt.Panel is an example of an available AWT component. If the dip is not to be attached to an AWT component, the process terminates. Otherwise, a method listener for "addNotify()" method is created (step 702). In the depicted example, the addnotify method is used to initiate display of the dip because this method is common to all Java AWT components. The informational dialog will appear each time the addnotify() method of its dippable bean is invoked. Next, the text and graphic property are set for the dialog (step 704).

Turning now to FIG. 8, a flowchart of a process for displaying an informational dialog is illustrated in accordance with a preferred embodiment of the present invention. The informational dialog for the dip is displayed prior to the bean to which the dip is applied is displayed or generates a display. In this process, the informational dialog remains displayed until a selected action, such as the "clicking" of a button occurs. The process begins by waiting for a method call (step 800). When a method call occurs, a determination is made as to whether the method call is an "addNotify()" call made on the Java bean (step 802). If the method call is an "addNotify ()" method call, the process then displays the informational dialog based on the property values set for the informational dialog (step 804). The process then determines whether a button click has occurred (step 806). In this example, a button click involves placing a pointer over a selected button and depressing the button. Although this example employs a button click, other actions may be used to determine whether the informational dialog should be dismissed or removed from the display. For example, one action may include entering selected information in place of or in addition to using a button click. If a button click has been detected, then the informational dialog is removed from the display (step 808) with the process returning to step 800 to wait for another method call. The dismissal of the dialog is initiated in response to a button click, causing an actionPerformed() method to be invoked. Addnotify and actionPerformed are methods common to all AWT components. If the method call in step 802 is not an "addNotify()" method call, then the process returns to step 800 to wait for a method call.

Refering again to step 806, if a button click has not occurred, the process returns to step 806 as described above.

Turning now to FIG. 9, a diagram of code used in a splash screen dip is depicted in accordance with a preferred embodiment of the present invention. This figure illustrates logic employed to create and display an informational dialog. This code is in the Java programming language and is used in the handleMethodCall method and is placed after the "Place code here for responding to 'addNotify()'" comment. Section 900 contains logic for the informational dialog to do nothing if no property settings are present. Section 902 is employed to find an existing parent frame for use or otherwise create a new frame. Section 904 provides a dialog graphical user interface component while section 906 adds an image to be displayed. Section 908 adds text for display. A button is employed to make the splash screen disappear in the code in section 910. Sizing of the window is set in section 912. The position of the window is set by section 914. Section 916 displays the splash screen. The actual mechanism for making the informational dialog go away when the button is pressed is found in section 918.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for attaching an informational dialog to a program, the method comprising the data processing system implemented steps of:

morphing the program, to extend an existing interface of the program to create a dippable program;

creating a dip for the dippable program, wherein the dip modifies runtime behavior of the existing interface of the dippable program to include an informational dialog; and adding the dip to the dippable program, wherein the informational dialog is attached to the dippable program.

2. The method of claim 1, wherein the program is a Java bean.

3. The method of claim 1, wherein the program is a plurality of beans.

4. The method of claim 1, wherein the informational dialog is displayed prior to the dippable program displaying information.

5. The method of claim 4, wherein the informational dialog is dismissed in response to a selected action.

6. A method in a data processing system for attaching an informational dialog to a bean, the method comprising the data processing system implemented steps of:

creating the informational dialog;

creating a dip for the bean using the informational dialog, wherein the dip modifies the runtime behavior of an existing interface of the bean to include the informational dialog; and attaching the dip to the bean.

7. The method of claim 6, wherein the step of attaching comprises:

morphing the bean to extend an existing interface of the bean to create a dippable bean; and attaching the dip to the dippable bean to create a dipped bean.

8. The method of claim 6, wherein the step of creating comprises:

creating the informational dialog; and setting properties for the informational dialog.

9. The method of claim 8, wherein the step of setting properties includes:

selecting text for the informational dialog.

10. The method of claim 8, wherein the step of setting properties includes:

selecting a graphical property for the informational dialog.

11. A computer system for attaching an informational dialog to a program, the computer system comprising:

a bus;

a bridge connected to the bus;

a memory connected to the bridge, wherein the memory comprises computer executable instructions;

a processor connected to the bridge, wherein the processor executes the computer executable instructions to direct the computer system to:

morph the program, to extend an existing interface of the program, wherein the program becomes a dippable program;

create a dip for the dippable program, wherein the dip modifies the runtime behavior of the existing interface of the dippable program to include an informational dialog; and add the dip to the dippable program to create a dipped program, wherein the informational dialog is attached to the dippable program.

12. The computer system of claim 11, wherein the program is a plurality of beans.

13. The computer system of claim 11, wherein the informational dialog is displayed prior to the dippable program displaying information.

14. The computer system of claim 13, wherein the informational dialog is dismissed in response to a selected action.

15. A data processing system for attaching an informational dialog to a bean, the data processing system comprising:

a bus;

a bridge connected to the bus;

a memory connected to the bridge, wherein the memory comprises computer executable instructions;

a processor connected to the bridge, wherein the processor executes the computer executable instructions to direct the computer system to:

create an informational dialog;

create a dip for the bean using the informational dialog, wherein the dip modifies the runtime behavior of an existing interface of the bean to include the informational dialog; and attach the dip to the bean.

16. The data processing system of claim 15, wherein attach the dip to the bean comprises:

morphing the bean to extend an existing interface of the bean to create a dippable bean; and attaching the dip to the dippable bean.

17. The data processing system of claim 15, wherein the creating means comprises:

creating the informational dialog;

setting properties for the informational dialog.

18. The data processing system of claim 17, wherein the setting properties comprises:

selecting text for the dialog.

19. The data processing system of claim 17, wherein the setting properties comprises:

selecting a graphical property for the dialog.

20. A computer program product for attaching informational dialog to a program, the computer program product comprising:

a computer readable recordable type medium having computer executable instructions stored thereon, the computer executable instructions comprising:

first instructions for morphing the program to extend an existing interface of the program, wherein the program becomes a dippable program;

second instructions for creating a dip for the program, wherein the dip modifies runtime behavior of the existing interface of the dippable program to include an informational dialog; and third instructions for adding the dip to the dippable program, wherein the informational dialog is attached to the dippable program.

* * * * *